(12) United States Patent
Beiser et al.

(10) Patent No.: US 9,137,381 B2
(45) Date of Patent: Sep. 15, 2015

(54) SYSTEM AND METHOD FOR DYNAMIC PHONE EXTENSION SYNCHRONIZATION BETWEEN CALL CONTROL DEVICES

(75) Inventors: Roy Beiser, Beer-Sheva (IL); Itzhak Eizenberg, Haifa (IL); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,607

(22) PCT Filed: Apr. 9, 2012

(86) PCT No.: PCT/US2012/032783
§ 371 (c)(1),
(2), (4) Date: Jun. 19, 2013

(87) PCT Pub. No.: WO2013/154528
PCT Pub. Date: Oct. 17, 2013

(65) Prior Publication Data
US 2014/0198908 A1 Jul. 17, 2014

(51) Int. Cl.
*H04M 7/00* (2006.01)
*H04M 3/42* (2006.01)
*H04M 3/54* (2006.01)

(52) U.S. Cl.
CPC .......... *H04M 7/009* (2013.01); *H04M 3/42272* (2013.01); *H04M 3/546* (2013.01)

(58) Field of Classification Search
CPC .............. H04M 3/42; H04M 3/42153; H04M 3/42229; H04M 3/42059; H04M 3/428; H04M 3/4288; H04M 3/436; H04M 3/50; H04M 3/5141; H04M 3/54; H04M 3/541; H04M 3/543; H04M 3/545; H04M 3/546; H04M 2203/2033; H04M 2242/22; H04Q 3/0029; H04Q 3/72
USPC ................ 379/70, 88.19, 93.35, 142.07, 157, 379/201.01, 201.02, 201.03, 207.02, 379/210.02, 210.03, 211.01, 211.02, 379/212.01, 213.01, 214.01, 215.01, 379/220.01, 221.01, 221.14
See application file for complete search history.

(56) References Cited

U.S. PATENT DOCUMENTS

| | | | |
|---|---|---|---|
| 7,965,699 B1 * | 6/2011 | Accardi et al. ................ 370/351 |
| 7,991,141 B2 * | 8/2011 | Blohm et al. ................ 379/219 |
| 2006/0029203 A1 * | 2/2006 | Bhusri ..................... 379/220.01 |
| 2007/0081658 A1 * | 4/2007 | Blohm et al. ................. 379/272 |
| 2008/0043976 A1 * | 2/2008 | Maximo et al. .......... 379/220.01 |
| 2008/0192920 A1 * | 8/2008 | Bhusri ......................... 379/229 |
| 2010/0054438 A1 * | 3/2010 | Ekstrom .................. 379/201.02 |
| 2010/0130213 A1 * | 5/2010 | Vendrow et al. .............. 455/445 |
| 2010/0296510 A1 * | 11/2010 | Zellner et al. ................. 370/352 |
| 2010/0310057 A1 * | 12/2010 | Theppasandra et al. ... 379/88.04 |

* cited by examiner

*Primary Examiner* — Khai N Nguyen
(74) *Attorney, Agent, or Firm* — Garrett IP, LLC

(57) ABSTRACT

Systems and methods described herein may allow for the sharing of routing information among call control devices. The routing information may be stored in an information repository, where call control devices may access the routing information as needed. The information repository may be centrally located for centralized access by call control devices, or may be distributed to individual call control devices for localized access.

42 Claims, 7 Drawing Sheets

SYSTEM AND METHOD FOR DYNAMIC PHONE EXTENSION SYNCHRONIZATION BETWEEN CALL CONTROL DEVICES

BACKGROUND

As people move about geographically, whether for personal or business reasons, they often want or need to stay in communication with other parties. People want the ability to receive telephone calls, even if they happen to be away from the home or office. Moreover, it is typical for a person to have more than one telephone with which he communicates. A person may have a home phone, a work phone, and a cell phone, all of which may have different telephone numbers.

To make communications simpler, a person may wish to be accessible through a single number. This saves the person from having to give out multiple phone numbers to friends, family and business associates, and in turns spares callers from having to guess which number to use at any given time. Moreover, this makes the person more easily accessible. The person may choose, for example, to have calls that would normally be directed to his office telephone, to be routed instead to his cell phone when he is travelling, or routed to each of several extensions where he might be reached. He can then be easily contacted, even when out of town.

In an enterprise setting, a related problem may exist when multiple switches may be put in place. A user may have an extension assigned to a first switch. When a second switch is added, perhaps having new or different technological capabilities, the second switch may need to know of the existence of the first switch (and vice versa). Moreover, the second switch may need to know how to route incoming communications to the user's extension.

In either scenario, call control devices such as switches need to share routing information. Currently, the sharing of routing information may be achieved by modification to one or more of the call control devices. Static configuration or reconfiguration of a private branch exchange (PBX) may be performed, for example.

Unfortunately, this configuration process may be cumbersome and error prone. One or more PBXs may have to be configured and reconfigured, if routing needs to change over time. Reliable and timely routing may therefore become problematic, given current technology.

BRIEF DESCRIPTION OF THE DRAWINGS/FIGURES

Figure 1:
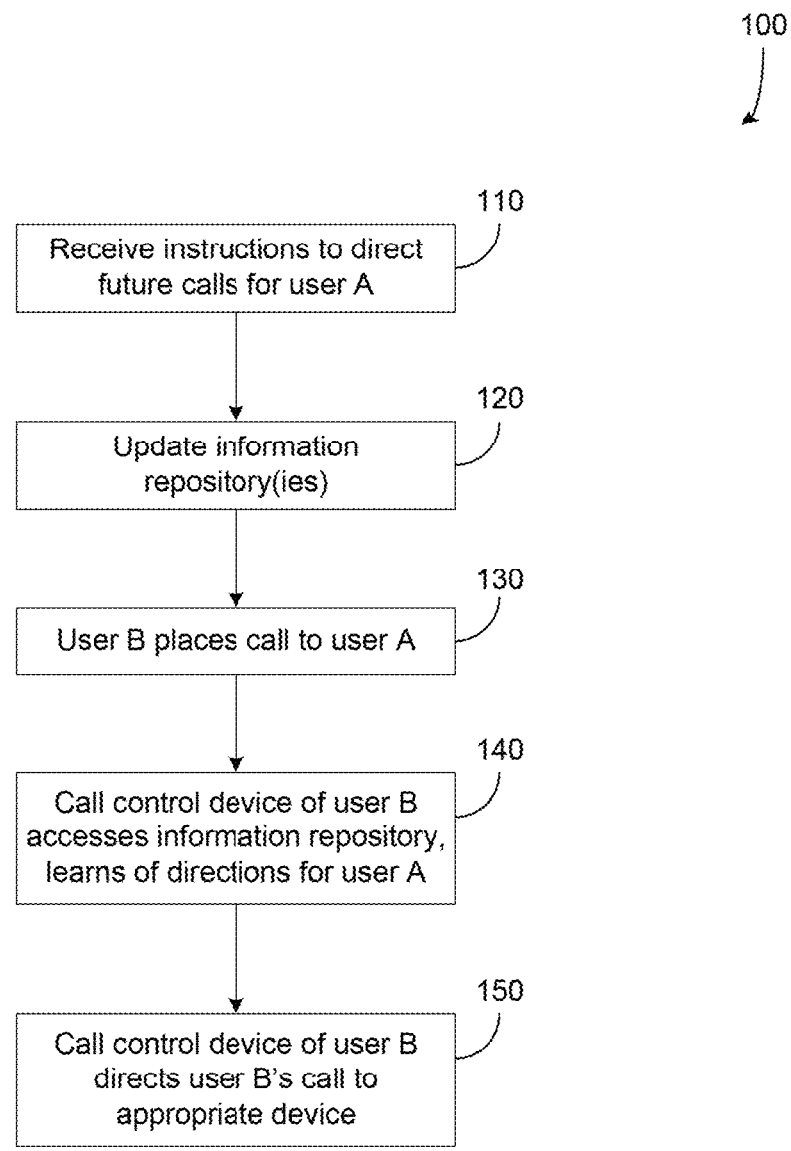
FIG. 1 is a flow chart illustrating processing, according to an embodiment.

In the drawings, the leftmost digit(s) of a reference number identifies the drawing in which the reference number first appears.

DETAILED DESCRIPTION

The methods and systems below address the technical problem of how to quickly and reliably provide routing instructions to call control devices, such as switches.

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the scope of the description. It will be apparent to a person skilled in the relevant art that this can also be employed in a variety of other systems and applications other than what is described herein.

Disclosed herein are methods and systems to share routing information among call control devices. This may allow the routing of a call according to the instructions of a user. Calls normally routed to one phone or extension of a user may instead be routed to one or more additional or different phones or other user devices. In this way, the phone or extension number of the user may effectively travel with the user; the user may receive calls that were originally destined to one of his telephones, but receive them at one or more other of his telephones. Moreover, the systems and methods described herein may also allow for the sharing of routing information among call control devices when, for example, a new call control device is added to a set of existing call control devices in an enterprise environment or other community. Here, the new call control device needs to be made aware of any existing call control device and the extensions assigned to it, and needs to know how to appropriately route calls intended for those extensions.

Routing instructions to direct calls for a first user may be provided to a first call control device. This call control device may be, for example, a PBX associated with one of the phones or extensions of this user. The routing instructions may then be conveyed to an information repository, such that other call control devices may access these routing instructions. In an embodiment, the information repository may be a central coordination system that may be accessed by any of a number of call control devices. The central coordination system may comprise a database that stores routing instructions, for example.

A second user attempting to call the first user will normally have the call handled by another call control device, such as a PBX, associated with the second user's phone or extension. This second call control device may need updated routing instructions; this device may then access the central coordination system to learn of the routing instructions for calls intended for the first user. The second user's call may then be routed appropriately to direct the call to the phone(s) of the first user at which the first user wants to receive calls. In this way, any call control device may learn the appropriate routing instructions necessary to reach the first user.

In an alternative embodiment, the information repository may be distributed among a set of call control devices, including the second call control device. The first call control device, after receiving the routing instructions, may distribute the routing instructions to each call control device in the set, including the second call control device and any other call control device which may need to know of the routing instructions. In this way, the second call control device, when processing a call intended for the first user, may learn of the routing instructions from its own local memory. The second call control device may then route the call accordingly.

The processing of the system described herein is illustrated in FIG. 1, according to an embodiment. At 110, instructions to direct future calls intended for a user A may be received at a call control device associated with the user device of user A, e.g., his telephone or extension. These instructions may define a number of parameters, including identification of the user device(s) at which the user is to receive calls. In some situations, the user device(s) may be in addition to or in place of his usual device. At 120, one or more information repositories may be updated using the received instructions. In an embodiment, this update may be performed by the above call control device of user A. A form of synchronization may be achieved between the call control devices after 110 and 120, in that both call control devices will have the appropriate routing instructions with respect to calls intended for user A.

At 130, a user B may place a call to user A. At 140, a call controller associated with user B may access one of the information repositories to learn of the routing instructions. This latter call control device may be the PBX accessed by user telephone when placing the call, for example. The information repository may be a central coordination system; alternatively, the information repository accessed by the call control device associated with user B may be internal to this call control device, as will be described in greater detail below. At 150, the call controller associated with user B may route the call in accordance with the routing instructions, e.g., to an appropriate call control device consistent with the instructions.

Figure 2:
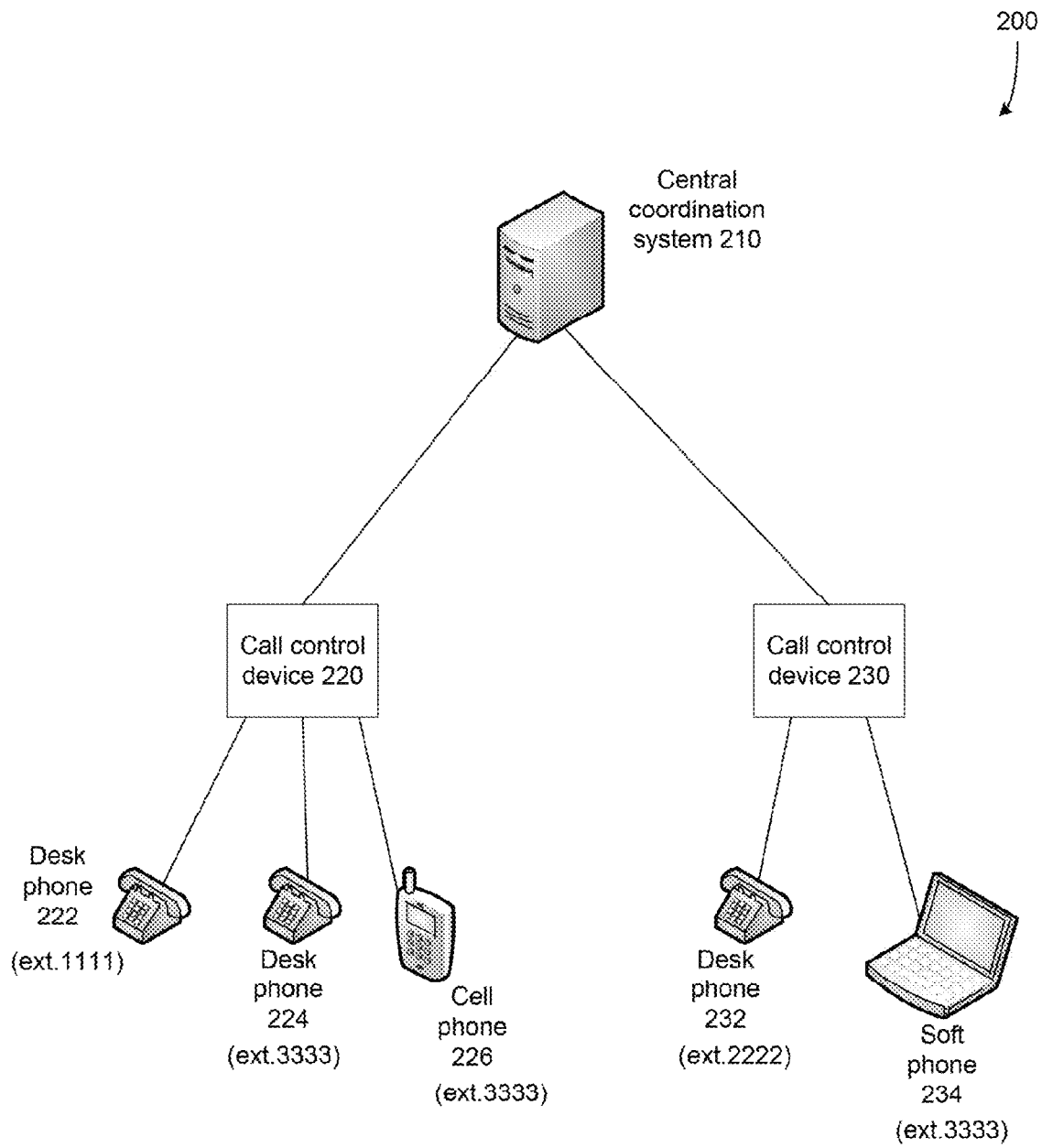
FIG. 2 illustrates a system that incorporates a central coordination system, according to an embodiment.

FIG. 2 illustrates an embodiment in which a central coordination system may serve as the information repository. Call control devices 220 and 230 may be in communication with central coordination system 210. If a call control device receives routing instructions, these instructions may be passed to central coordination system 210. Such instructions may be stored in a database in central coordination system 210, according to an embodiment.

A call control device may be a switching device, such as a PBX. Call control device 220 may be in communication with a number of end-user devices, such as desk phone 222, desk phone 224, and cell phone 226. Call control device 230 may be in communication with end-user devices such as desk phone 232 and a laptop or other computing device acting as a "soft phone" 234. In this example, some or all of the end-user devices may be assigned extension numbers. A user may wish to have incoming calls that are normally directed to extension 3333, directed instead to several of his end-user devices. This would allow the user to receive calls intended for the extension, even though the user may be physically located at any of several other locations. In this way, the number (extension 3333 in this example) may effectively follow the user to each of several devices. Calls that are directed to that extension may therefore be routed to cell phone 226, desk phone 224, and/or to soft phone 234. As a result, each of these three devices may effectively serve as extension 3333.

Such an arrangement requires a variation of the normal routing for calls directed to this extension. Calls that are normally routed to extension 3333 may now be routed to desk phone 224, cell phone 226, and soft phone 234. Routing instructions that define such direction may be sent to central coordination system 210 were they may be stored. In this embodiment, these instructions may first be received and implemented at one of the call control devices, which may then pass the routing instructions to the central coordination system 210. Here, the routing instructions may be accessed by any call control device that needs to know where to route calls intended for extension 3333. In this way, if a call control device needs to route such a call, this call control device may consult central coordination system 210, where the call control device may learn of the new routing instructions. The call may then be routed accordingly by this call control device and by any other call control device requiring these instructions.

In another scenario, call control device 230 may have been newly added to enterprise 200. Here, this device may need to know that the user has user devices 224 and 226 that correspond to extension 3333 and are connected to call control device 220. This connectivity and resulting routing information may need to be shared with the new call control device 230. In this case, call control device 230 may obtain the necessary routing instructions in the manner described above. Initially, routing instructions may be sent by call control device 220 to central coordination system 210 were they may be stored. Here, the routing instructions may be accessed by any call control device that needs to know where to route calls intended for extension 3333. In this way, when call control device 230 needs to route such a call, this call control device may consult central coordination system 210, and call control device 230 may thereby learn of the new routing instructions. The call may then be routed accordingly by this call control device.

In an embodiment, communications between the central coordination system 210 and a call control device may take place over a data network running a TCP/IP transport protocol with a voice over IP (VOIP) application layer, such as the session initiation protocol (SIP).

Figure 3:
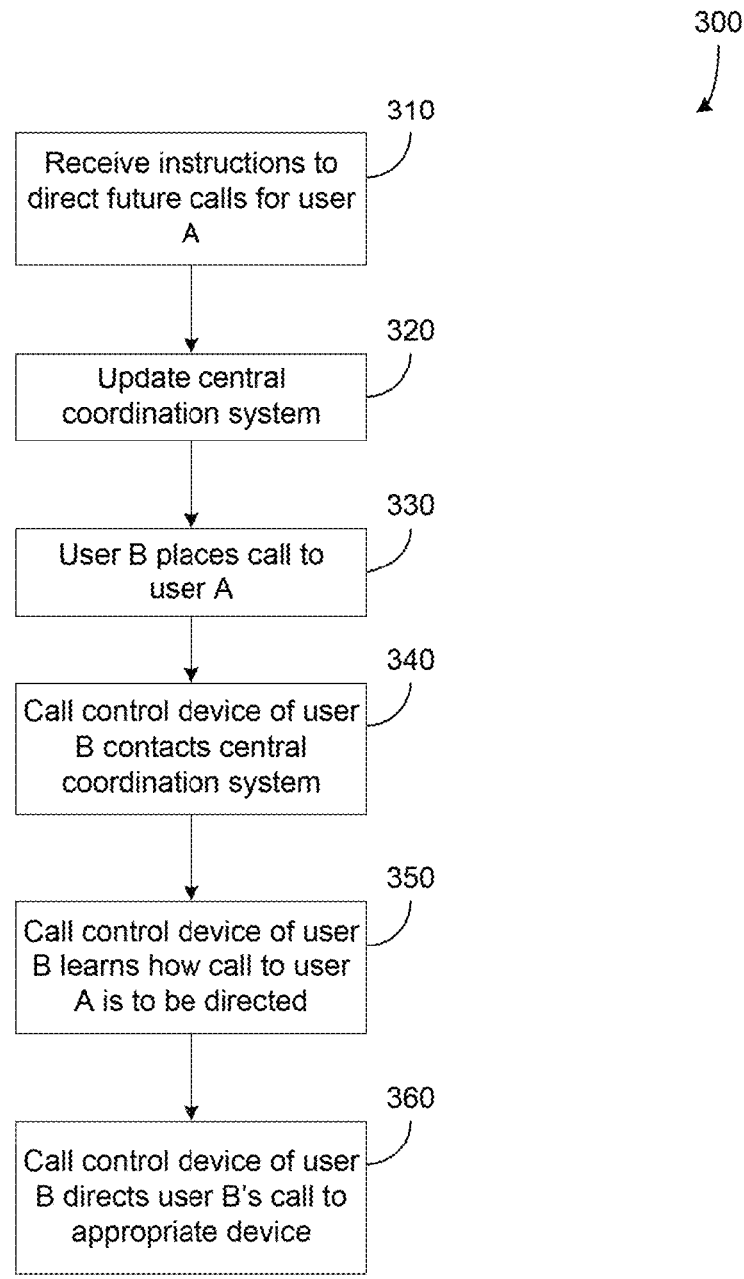
FIG. 3 is a flow chart illustrating the operation of the system of FIG. 2, according to an embodiment.

Processing for the system of FIG. 2 is illustrated in FIG. 3, according to an embodiment. At 310, a call control device may receive instructions regarding how to direct future calls that are intended for a phone or extension of user A. These instructions may define a number of parameters, including a different user device at which the user is to receive calls, in addition to or in place of his usual device. At 320, the call control device may update the central coordination system with these routing instructions. At 330, a user B may place a call to user A. At 340, a call control device that is seeking to route user B's call may contact the central coordination system. At 350, this call control device may learn how to route the call using the information (i.e., using the routing instructions) stored in the central coordination system. At 360, this call control device may direct user B's call as necessary, e.g., to an appropriate call control device or user device, based on the routing instructions.

Figure 4:
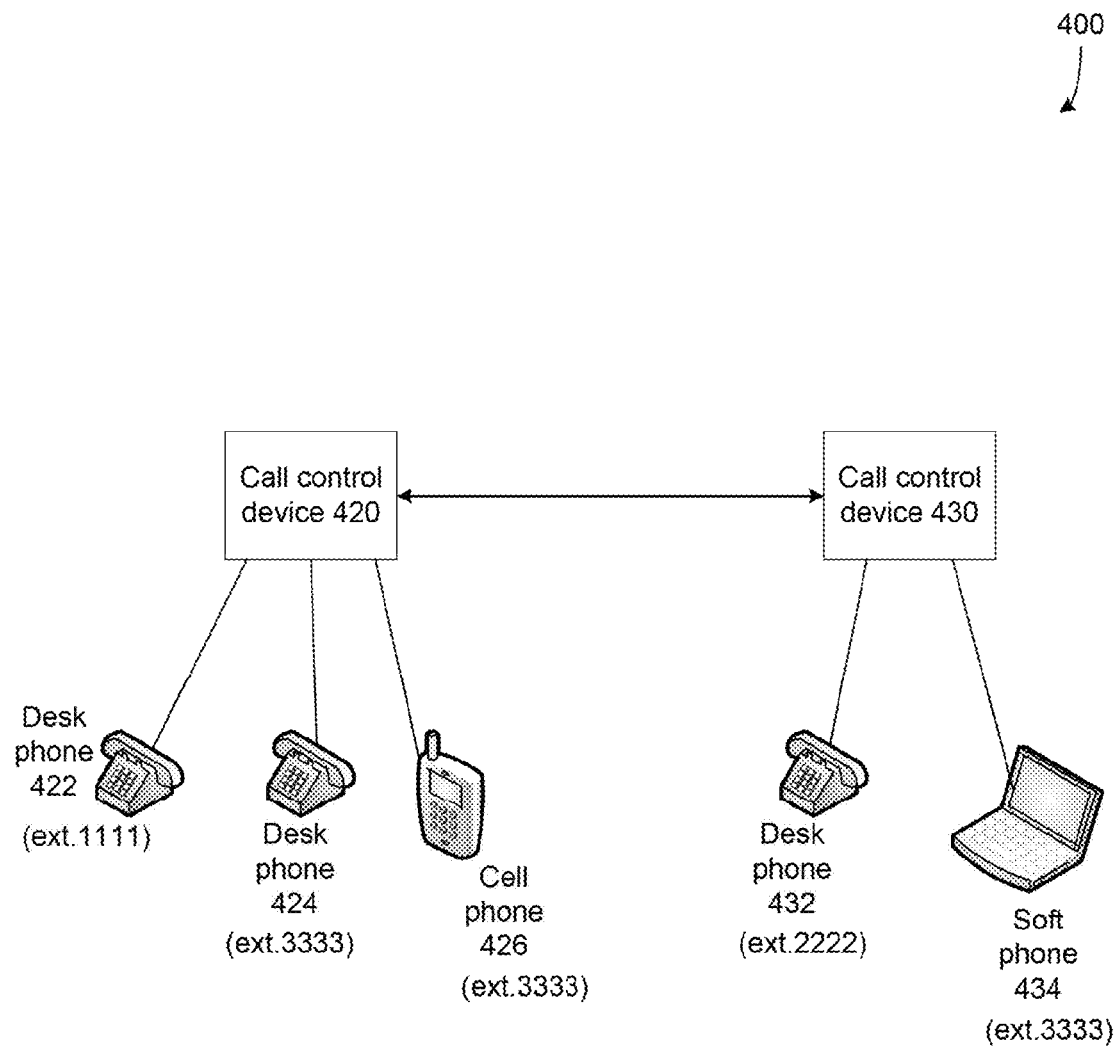
FIG. 4 illustrates a system in which routing instructions may be stored in call control devices, according to an embodiment.

An alternative embodiment is illustrated in FIG. 4. Here, the functionality of the information repository may be distributed among call control devices, so that each call control device may serve as an information repository storing routing instructions. Call control device 420 may be in communication with a number of end-user devices, such as desk phone 422, desk phone 424, and cell phone 426. Call control device 430 may be in communication with end-user devices such as desk phone 432 and a laptop or other computing device acting as a soft phone 434. As in the previous example, all of the end-user devices may be assigned extension numbers. A user may wish to have incoming calls that are normally directed to extension 3333, directed to one or more of his other end-user devices. This would allow the user to receive calls intended for the extension, even though the user may be physically located at any of several other locations. In this way, the number (extension 3333) may effectively follow the user to each of several devices. Calls that are directed to that extension may therefore be routed to cell phone 426, desk phone 424, and/or to soft phone 434. As a result, each of these three devices may serve as extension 3333.

Again, such an arrangement requires a variation of the normal routing for calls directed to this extension. Calls that are normally routed to extension 3333 may now be routed to desk phone 424, cell phone 426, and soft phone 434. Such direction, i.e., routing instructions, may be shared among several call control devices. In this embodiment, these instructions may first be received and implemented at one of the call control devices, which may then pass the direction instructions to other call control devices that may need this information. As a result, each call control device may have a local copy of updated routing instructions stored in its local memory. Any of the call control devices may then know where to route calls intended for extension 3333. In this way, if a call control device needs to route such a call, the call control device may consult its local memory and learn of the new routing instructions. The call may then be routed accordingly.

In another scenario, call control device 430 may have been newly added to enterprise 400. Here, this call control device may need to know that the user has user devices 324 and 326 that correspond to extension 3333 and are connected to call control device 320. This connectivity and resulting routing information may need to be shared with the new call control device 430. In this case, call control device 430 may obtain the necessary routing instructions in the manner described above. In this embodiment, these instructions may first be received and implemented at call control device 420, which may then pass the direction instructions to other call control devices that may need this information, such as call control device 430. As a result, other call control devices in the enterprise may have a local copy of updated routing instructions stored in its local memory. Any of these call control devices, including call control device 430, may then know where to route calls intended for extension 3333. In this way, when call control device 430 needs to route such a call, this call control device may consult its local memory and learn of the new routing instructions. The call may then be routed accordingly.

In an embodiment, communications between the call control devices for purposes of updating routing instructions may take place over a data network running a TCP/IP transport protocol with a VOIP application layer, such as SIP.

Figure 5:
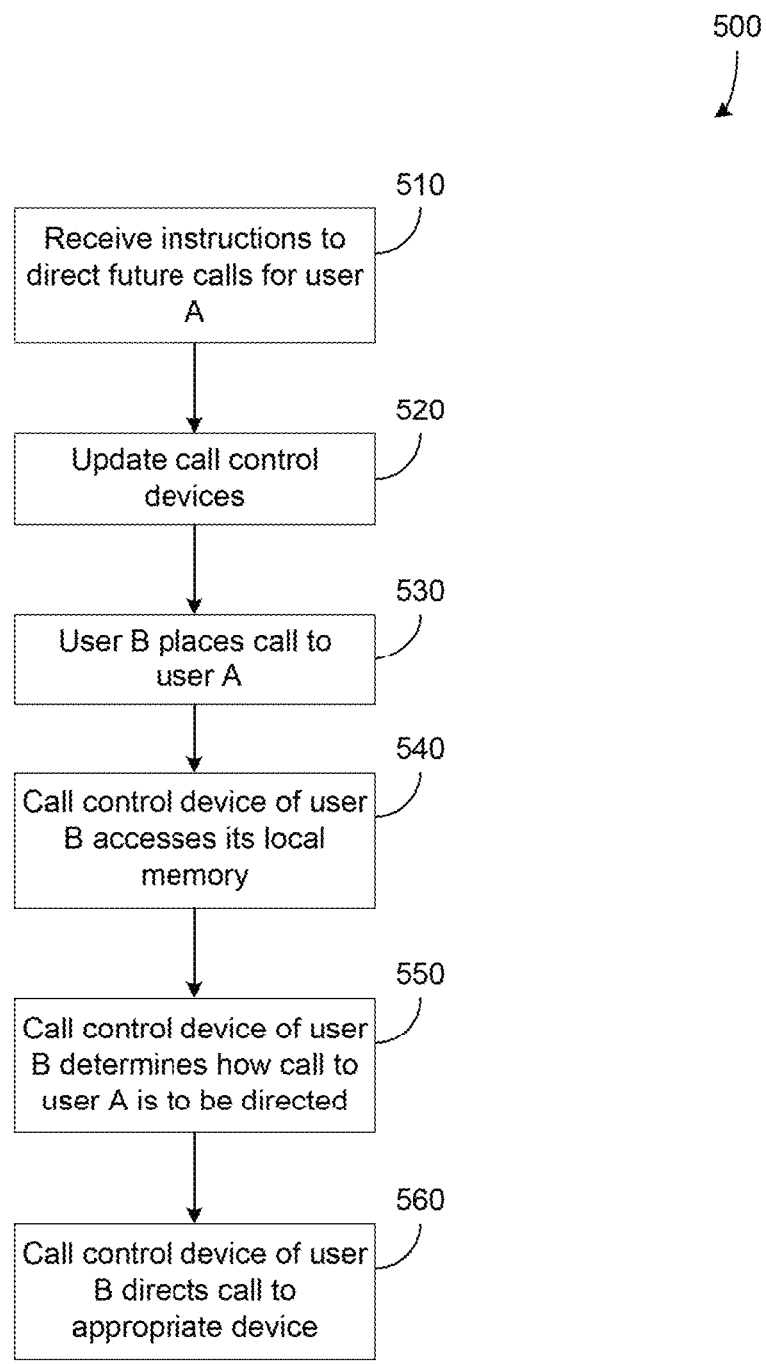
FIG. 5 is a flow chart illustrating the operation of the system of FIG. 4, according to an embodiment.

The processing for the system of FIG. 4 is illustrated in FIG. 5, according to an embodiment. At 510, direction instructions for future calls to user A may be received. In an embodiment, these instructions may be received at a call control device and stored in its internal memory. At 520, this call control device may update other call control devices with these routing instructions. At 530, user B may place a call to user A. At 540, a call control device trying to route this call may access its local memory. At 550, this call control device may then learn how the call needs to be routed, by reading the routing instructions stored in its memory. At 560, this call control device may route the call accordingly.

In this embodiment, the communication of updated routing instructions among call control devices may take place in any of several ways. The routing instructions may be sent in serial from one call control device to another, for example, until all the call control devices that may require the routing instructions are updated. Alternatively, the routing instructions may propagate through this set of call control devices in parallel according to a predefined topological propagation algorithm. Alternatively, a call control device may broadcast routing instructions to each of the call control devices simultaneously.

Moreover, in an alternative embodiment, the use of a central coordination system (as shown in FIG. 2) and the use of a distributed system (as shown in FIG. 4) may be combined, so that both mechanisms for the distribution of routing instructions may be available. This embodiment may provide for redundant mechanisms by which such instructions may be made available to call control devices, allowing for improved system robustness.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

In an embodiment, some or all of the processing described herein may be implemented as software or firmware. Such a software or firmware embodiment is illustrated in the context of a computing system 600 in FIG. 6. System 600 may include a central processor unit (CPU) 620 and a body of memory 610 that may include one or more non-transitory computer readable media that may store computer program logic 640. Memory 610 may be implemented as a read-only memory (ROM) or random access memory (RAM) device, for example. CPU 620 and memory 610 may be in communication using any of several technologies known to one of ordinary skill in the art, such as a bus or a point-to-point interconnect. Computer program logic 640 contained in memory 610 may be read and executed by CPU 620. In an embodiment, one or more I/O ports and/or I/O devices, shown collectively as I/O 630, may also be connected to CPU 620 and memory 610.

Figure 6:
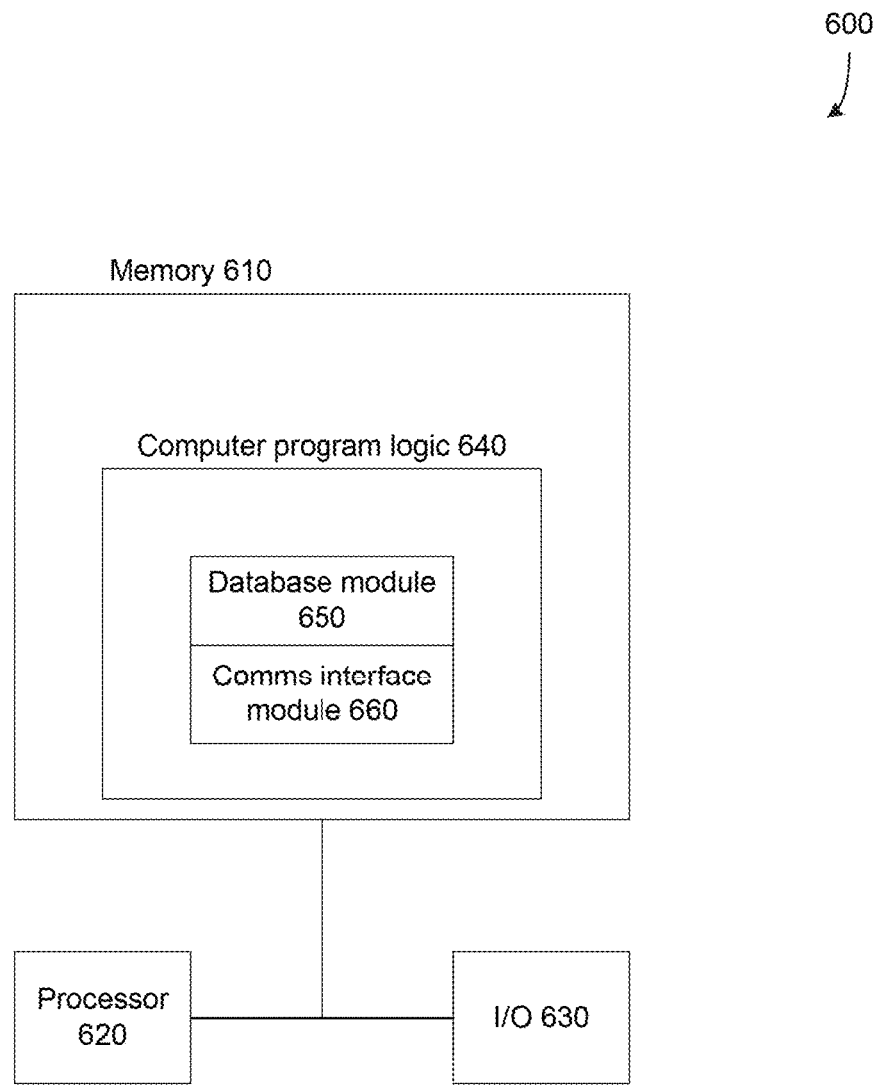
FIG. 6 is a block diagram of a computer system that may implement processing at a central coordination system, according to an embodiment.

In the embodiment of FIG. 6, system 600 may operate in the context of a central coordination system. Routing instructions may be stored in memory 610 in a database (not shown) or other accessible data structure with comparable functionality. In such an embodiment, computer program logic 640 may include a database module 650 responsible for searching, reading from, and writing to, a database of routing instructions. Computer program logic 640 may also include a communications interface module 660 responsible for facilitating communications between the central coordination system and external components, such as call control devices. Database module 650 and communications interface module 660 may collectively make the routing instructions available to external call control devices.

As noted above, communications between the central coordination system and call control devices may take place over a data network finning a TCP/IP transport protocol with an VOIP application layer such as SIP. Module 660 may embody some or all of the logic that executes or supports these protocol layers.

Figure 7:
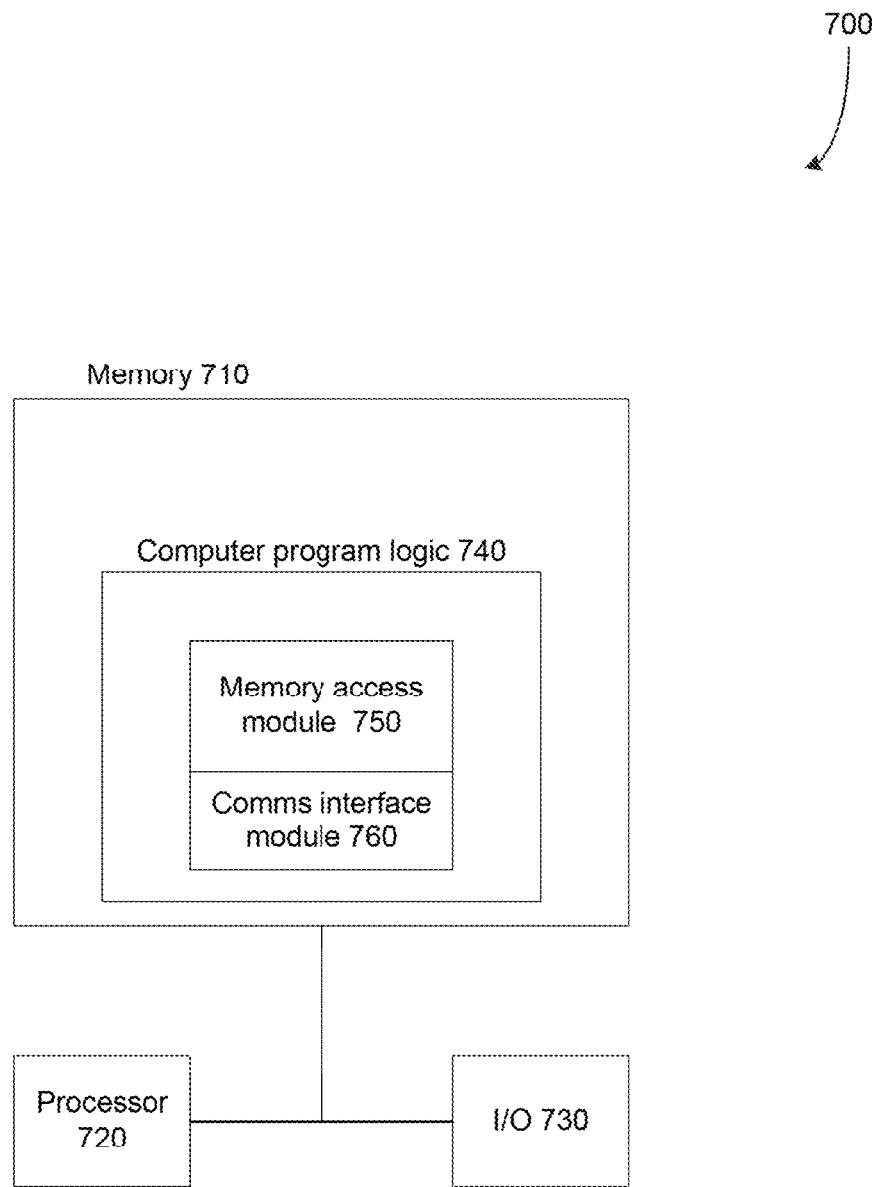
FIG. 7 is a block diagram of a computer system that may implement processing at a call control device, according to an embodiment.

In an embodiment where the information depository of routing instructions is distributed among call control devices, such a call control device may incorporate a computing system such as that shown in FIG. 7. System 700 may include a central processor unit (CPU) 720 and a body of memory 710 that may include one or more non-transitory computer readable media that may store computer program logic 740. Memory 710 may be implemented as a read-only memory (ROM) or random access memory (RAM) device, for example. CPU 720 and memory 710 may be in communication using any of several technologies known to one of ordinary skill in the art, such as a bus or a point-to-point interconnect. Computer program logic 740 contained in memory 710 may be read and executed by CPU 720. In an embodiment, one or more I/O ports and/or devices, shown collectively as I/O 730, may also be connected to CPU 720 and memory 710.

In an embodiment, routing instructions may be stored in memory 710 in a database (not shown) or other accessible data structure with comparable functionality. In the illustrated embodiment, computer program logic 740 may include a memory access module 750. This module may allow switching logic in a call control device to access stored routing instructions, and to write newly received routing instructions to memory. It may also facilitate the retrieval of routing instructions from memory for communication to other call control devices. Computer program logic 740 may also include a communications interface module 760 responsible for facilitating communications between the call control device and other call control devices. Memory access module 750 and communications interface module 760 may collectively make the routing instructions available to external call control devices and receive additional routing instructions. As noted above, such communication between call control devices may take place over a data network running a TCP/IP transport protocol with a VOIP application layer such as SIP.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

An advantage of the systems and methods described herein is that routing instructions may be updated quickly and reliably using these approaches. An embodiment where a central coordination system is used has an advantage of requiring updates at only a single location. An embodiment in which call control devices store routing instructions has an advantage of having updated routing instructions available locally to the individual call control devices, allowing for fast retrieval.

An embodiment of a method for distributing routing instructions for calls is described herein. The method may comprise receiving, at a first call control device that is associated with a first user, routing instructions to direct future calls intended for the first user. The method may further comprise updating one or more information repositories with the instructions, wherein the one or more repositories contain information specifying how calls are to be directed, such that the instructions are available to a second call control device that is associated with a second user when the second user attempts to call the first user, to allow the second call control device to determine that the call is to be routed according to the instructions in the one or more information repositories.

In an alternative embodiment, a method for distributing routing instructions for calls may comprise accessing an information repository containing routing instructions. The method may further comprise using the instructions to determine how to route a call from a second user to a first user, wherein the repository is one of one or more information repositories updated by a first call control device that is associated with the first user, according to routing instructions provided to the call control device of the second user.

In an alternative embodiment, a method for distributing routing instructions for calls may comprise, at an information repository, receiving an update to routing instructions stored in the repository, wherein the update is received from a first call control device associated with a first user. The method may further comprise, at the information repository, making the updated routing instructions available to a second call control device when the second call control device attempts to route a call from a second user to the first user.

In any of these embodiments, the one or more information repositories may comprise a central database. Alternatively or in addition, one of the one or more information repositories may be located in the second call control device. Others of the one or more information repositories may reside in one or more respective additional call control devices. The call control devices may each comprise a private branch exchange. The updating may take place using a communications protocol that uses a TCP/IP transport layer protocol. The communications protocol may use a VOIP protocol (such as SIP) at an application layer.

Any of the above methods may be implemented with a computer program product comprising at least one computer useable medium having control logic stored therein for the distribution of routing instructions for calls. The computer control logic may be configured to execute on a processor to perform any of the above methods.

An embodiment of a system for distributing routing instructions for calls is described herein. The system may comprise one or more information repositories configured to receive routing instructions from a first call control device associated with a first user, to store said routing instructions to direct future calls intended for the first user, and to allow access to said routing instructions by a second call control device, associated with a second user. When the second user attempts to call the first user, the one or more information repositories allows the second call control device to access said routing instructions and to thereby determine how the call is to be routed according to the routing instructions.

An alternative system for distributing routing instructions for calls may comprise a first call control device that is associated with a first user and is configured to receive routing instructions to direct future calls that are intended for the first user, and to send said routing instructions to one or more information repositories. Such a system may also comprise a second call control device that is associated with a second user and is configured to access said routing instructions at said one or more information repositories when the second user attempts to call the first user, and to determine how the call is to be routed according to the routing instructions.

The one or more information repositories may comprise a central database. Alternatively or in addition, the one or more information repositories may reside in the second call control device. Others of the one or more information repositories may further reside in other respective call control devices. The call control devices may each comprise a private branch exchange. Communications between the one or more information repositories and the first and second call control devices may take place using a communications protocol that uses a TCP/IP transport layer protocol. The communications protocol may use a VOIP protocol (such as SIP) at an application layer.

While various embodiments are disclosed herein, it should be understood that they have been presented by way of example only, and not limitation. It will be apparent to persons skilled in the relevant art that various changes in form and detail may be made therein without departing from the scope of the methods and systems disclosed herein. Thus, the breadth and scope of the claims should not be limited by any of the exemplary embodiments disclosed herein.

What is claimed is:

1. An apparatus, comprising:
   a first call control device associated with a first device of a first user; and
   a second call control device associated with a device of a second user;
   wherein the first call control device is configured to receive routing instructions to route calls to the first user, and to provide the routing instructions to one of a repository and the second call control device; and
   wherein the second call control device is configured to receive the routing instructions from one of the first call control device and the repository, and to route a call placed to the first device from the device of the second user based on the routing instructions.

2. The apparatus of claim 1, wherein the second call control device is further configured to route the call to one or more of multiple devices of the first user based on the routing instructions.

3. The apparatus of claim 1, wherein the first and second call control devices are further configured as respective first and second private branch exchanges (PBXs), and wherein second call control device is configured to route the call to a second device of the first user that is not associated with the first PBX, based on the routing instructions.

4. The apparatus of claim 3, wherein the second call control device is further configured to route the call to a cellular telephone of the first user based on the routing instructions.

5. The apparatus of claim 3, wherein the second call control device is further configured to route the call to a voice over Internet protocol based device of the first user based on the routing instructions.

6. The apparatus of claim 1, and wherein the second call control device is further configured to:
   receive the routing instructions over a packet-based network;
   store the routing instructions in a non-transitory computer readable medium; and
   retrieve the routing instructions for the call from the non-transitory computer readable medium at a time of the call.

7. The apparatus of claim 6, wherein the second call control device is further configured to receive the routing instructions from the repository over the packet-based network.

8. The apparatus of claim 6, wherein the second call control device is further configured to communicate with the first call control device over the packet-based communication network to receive the routing instructions.

9. The apparatus of claim 1, wherein the second call control device is further configured to receive the routing instructions over a packet-based communication network at a time of the call.

10. The apparatus of claim 9, wherein the second call control device is further configured to receive the routing instructions from the repository over the packet-based network at the time of the call.

11. The apparatus of claim 1, wherein the second call control device is further configured to communicate with the first call control device over the packet-based communication network to receive the routing instructions from the first call control device at the time of the call.

12. The apparatus of claim 1, wherein the second call control device is further configured to communicate with the first call control device over a packet-based communication network to provide routing instructions to the first call control device for calls placed to the device of the second user.

13. The apparatus of claim 1, wherein the second call control device is further configured to provide routing instructions for calls placed to the device of the second user to the repository over a packet-based communication network for distribution to the first call control device.

14. The apparatus of claim 1, further including the repository to interface between the first and second call control devices over a packet-based communication network, including to:
   receive routing instructions associated with users of the first call control device from the first call control device over the packet-based communication network;
   receive routing instructions associated with users of the second call control device from the second call control device over the packet-based communication network; and
   provide the routing instructions received from each of the first and second call control devices to the other one of the first and second call control devices over the packet-based communication network.

15. A method, comprising:
   receiving routing instructions to route calls to a first user at a first call control device associated with a first device of the first user;
   providing the routing instructions from the first call control device to one of a repository and a second call control device associated with a device of a second user;
   receiving the routing instructions from one of the first call control device and the repository, at the second call control device; and
   routing a call placed to the first device from the device of the second user based on the routing instructions, at the second call control device.

16. The method of claim 15, wherein the routing includes routing the call to one or more of multiple devices of the first user based on the routing instructions.

17. The method of claim 15, wherein the first and second call control devices are configured as respective private branch exchanges (PBXs), and wherein the routing includes routing the call to a second device of the first user that is not associated with the first PBX, based on the routing instructions.

18. The method of claim 17, wherein the routing further includes routing the call to a cellular telephone of the first user based on the routing instructions.

19. The method of claim 17, wherein the routing further includes routing the call to a voice over Internet protocol based device of the first user based on the routing instructions.

20. The method of claim 15, wherein the receiving routing instructions associated with users of the second call control device includes:
   receiving the routing instructions over a packet-based network; and
   storing the routing instructions in a non-transitory computer readable medium;
   wherein the routing includes retrieving the routing instructions from the non-transitory computer readable medium at a time of the call.

21. The method of claim 20, wherein the receiving routing instructions associated with users of the second call control device further includes receiving the routing instructions from the repository over the packet-based network.

22. The method of claim 20, wherein the receiving routing instructions associated with users of the second call control device further includes receiving the routing instructions from the first call control device over the packet-based network.

23. The method of claim 15, wherein the receiving routing instructions associated with users of the second call control device further includes receiving the routing instructions over a packet-based communication network at a time of the call.

24. The method of claim 23, wherein the receiving the routing instructions at the second call control device further includes receiving the routing instructions from the repository over the packet-based network at the time of the call.

25. The method of claim 23, wherein the receiving the routing instructions at the second call control device further includes receiving the routing instructions from the first call control device over the packet-based network at the time of the call.

26. The method of claim 15, further including providing routing instructions for calls placed to the device of the second user, from the second call control device to the first call control device, over a packet-based communication network.

27. The method of claim 15, further including providing routing instructions for calls placed to the device of the second user, from the second call control device to the repository, over a packet-based communication network, for distribution to the first call control device.

28. The method of claim 15, further including interfacing between the first and second call control devices over a packet-based communication network, wherein the interfacing includes:
   receiving routing instructions associated with users of the first call control device from the first call control device over the packet-based communication network;
   receiving routing instructions associated with users of the second call control device from the second call control device over the packet-based communication network; and
   providing the routing instructions received from each of the first and second call control devices to the other one of the first and second call control devices over the packet-based communication network.

29. A non-transitory computer readable medium encoded with a computer program that includes:
   instructions to cause a processor of a first call control device associated with a first device of a first user to receive routing instructions to route calls to the first user, and provide the routing instructions to one of a repository and the second call control device; and
   instructions to cause a processor of a second call control device associated with a device of a second user to receive the routing instructions at the second call control device from one of the first call control device and the repository, and route a call placed to the first device from the device of the second user based on the routing instructions.

30. The non-transitory computer readable medium of claim 29, further including instructions to cause the processor of the second call control device to:
   route the call to one or more of multiple telephone devices of the first user based on routing instructions.

31. The non-transitory computer readable medium of claim 29, wherein the first and second call control devices are configured as respective first and second private branch exchanges (PBXs), further including instructions to cause the processor of the second call control device to route the call to a second device of the first user that is not associated with the first PBX.

32. The non-transitory computer readable medium of claim 29, further including instructions to cause the processor of the second call control device to route the call to a cellular telephone of the first user based on routing instructions.

33. The non-transitory computer readable medium of claim 32, further including instructions to cause the processor of the second call control device to route the call to a voice over Internet protocol based device of the first user based on the routing instructions.

34. The non-transitory computer readable medium of claim 29, further including instructions to cause the processor of the second call control device to:
   receive the routing instructions over a packet-based network;
   store the received routing instructions in a non-transitory computer readable medium; and
   retrieve the routing instructions from the non-transitory computer readable medium at a time of the call.

35. The non-transitory computer readable medium of claim 34, further including instructions to cause the processor of the second call control device to receive the routing instructions from the repository over the packet-based network.

36. The non-transitory computer readable medium of claim 34, further including instructions to cause the processor of the second call control device to receive the routing instructions from the first call control device over the packet-based network.

37. The non-transitory computer readable medium of claim 29, further including instructions to cause the processor of the second call control device to receive the routing instructions over a packet-based communication network at a time of the call.

38. The non-transitory computer readable medium of claim 37, further including instructions to cause the processor of the second call control device to receive the routing instructions from the repository over the packet-based network at the time of the call.

39. The non-transitory computer readable medium of claim 37, further including instructions to cause the processor of the second call control device to receive the routing instructions from the first call control device over the packet-based network at the time of the call.

40. The non-transitory computer readable medium of claim 29, further including instructions to cause the processor of the second call control device to provide routing instructions for calls placed to the device of the second user to the first call control device over a packet-based communication network.

41. The non-transitory computer readable medium of claim 29, further including instructions to cause the processor of the second call control device to provide routing instructions for calls placed to the device of the second user to the repository over a packet-based communication network for distribution to the first call control device.

42. The non-transitory computer readable medium of claim 29, further including instructions to cause a processor of the repository to interface between the first and second call control devices over a packet-based communication network, including to:
   receive routing instructions associated with users of the first call control device from the first call control device over the packet-based communication network;
   receive routing instructions associated with users of the second call control device from the second call control device over the packet-based communication network; and
   provide the routing instructions received from each of the first and second call control devices to the other one of the first and second call control devices over the packet-based communication network.

\* \* \* \* \*